(12) United States Patent
Ray et al.

(10) Patent No.: US 7,675,038 B2
(45) Date of Patent: Mar. 9, 2010

(54) TRUNCATION COMPENSATION IN TRANSMISSION RECONSTRUCTIONS FOR A SMALL FOV CARDIAC GAMMA CAMERA

(75) Inventors: Manjit Ray, Hoffman Estates, IL (US); Eric Grant Hawman, Schaumburg, IL (US); Ray Xu, Algonquin, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 400 days.

(21) Appl. No.: 11/845,331

(22) Filed: Aug. 27, 2007

(65) Prior Publication Data

US 2009/0057560 A1  Mar. 5, 2009

(51) Int. Cl.
*G01T 1/166* (2006.01)

(52) U.S. Cl. .............................. 250/363.04; 250/363.03; 250/370.08

(58) Field of Classification Search ............ 250/363.03, 250/363.04, 370.08
See application file for complete search history.

(56) References Cited

U.S. PATENT DOCUMENTS 6,810,102 B2 *  10/2004  Hsieh et al. .................... 378/4

\* cited by examiner

*Primary Examiner*—David P Porta
*Assistant Examiner*—Mark R Gaworecki
(74) *Attorney, Agent, or Firm*—Peter L. Kendall

(57) ABSTRACT

A method and system for compensating truncated transmission projection data used for attenuation correction in a SPECT apparatus. The method and system include generating an initial estimate of a transmission reconstruction without modeling source geometry or detector collimator response and refining the transmission reconstruction by using the initial estimate with a modified model of the source geometry and the collimation geometry.

12 Claims, 3 Drawing Sheets

TRUNCATION COMPENSATION IN TRANSMISSION RECONSTRUCTIONS FOR A SMALL FOV CARDIAC GAMMA CAMERA

BACKGROUND DESCRIPTION

1. Technical Field

An embodiment of the present invention relates generally to medical diagnostic imaging such as Single Photon Emission Computed Tomography (SPECT) nuclear medicine studies and correction of data attenuation in such studies by using data acquired from a transmission source to generate an attenuation correction map. More specifically, an embodiment of the invention relates to extension or extrapolation of image data from a transmission scan beyond the limited field of view (FOV) of a gamma-ray detector so as to extend the transmission projection to a larger field of view corresponding to the actual area of a patient. The embodiment of the invention thus compensates for truncation of the transmission data by the limited FOV, to enable reconstruction of transmission projection data free from artifacts caused by truncation.

2. Background

In nuclear medicine imaging techniques such as SPECT and Positron Emission Tomography (PET), medical images are regenerated based on radioactive emission data, typically in the form of gamma rays, emitted from the body of a patient after the patient has ingested or been injected with a radiopharmaceutical substance. Emitted gamma rays are detected from numerous different projection angles by a gamma camera (a.k.a. Anger camera or scintillation camera) about a longitudinal axis of the patient, and converted into electrical signals that are stored as image data. Data from image projections provide a set of images as a result of a process known as image reconstruction.

In a conventional SPECT study of an organ such as the heart, a radioisotope (Tc-99m, Tl-201, for example) is administered to the patient and the radioisotope is taken up by the heart muscles. Then, the patient is placed in an imaging bed of a scintillation camera system and one or more scintillation camera detectors are rotated about the long axis of the patient and interact with gamma emissions from the patient's body at various angular orientations about the axis. The resulting data is used to form three-dimensional images (known as "SPECT images" or "tomographic images") of the distribution of the radioisotope within the patient.

Such three-dimensional SPECT images can be calculated based on a set of two-dimensional images ("projections" or "projection images") acquired by the scintillation camera system as the detectors are rotated about the patient in a series of steps; this calculation process is known as image reconstruction. The most commonly employed method of image reconstruction is known as filtered back-projection or FBP. When FBP reconstruction is used to reconstruct SPECT images from two-dimensional projection images obtained from a scintillation camera, some well-recognized distortions introduce errors or artifacts in the result. One of the most critical distortions is caused by attenuation of gamma radiation in tissue. As a consequence of attenuation, quantitative image values in the various projections do not accurately represent line integrals of the radioisotope distribution within the body. It is therefore necessary to correct for this distortion, and the process for doing so in SPECT is known as attenuation correction.

It is known to measure the actual attenuation coefficients of body tissues by placing a line source of gamma radiation on one side of the body and measuring the transmission of the gamma radiation through the body as a function of direction, i.e. collecting transmission CT data, as the line source is scanned across the patient's body. See, e.g. U.S. Pat. No. 5,576,545 (Stoub et al.) incorporated herein by reference in its entirety.

For small FOV cameras, such as the SIEMENS c.cam cardiac SPECT camera, the width of a patient can be much larger than the FOV, and therefore the transmission image projections at various projection angles are truncated, causing unwanted artifacts in transmission reconstruction, and thereby resulting in inaccurate attenuation correction maps.

Truncation compensation in transmission reconstructions for small field of view (FOV) cardiac SPECT cameras using arrays of line sources has not been previously addressed in the prior art. Attenuation correction using transmission data obtained from moving line sources is offered both by General Electric (Millennium ACuscan for the Millennium MG and MyoSIGHT systems) and Philips Medical Systems (VantagePro AC add-on for the CardioMD). However, only the VantagePro add-on offers truncation compensation.

The problem of truncation in transmission image reconstruction has been widely studied for SPECT imaging in general. In some of these reconstruction methods, the transmission reconstructions were extended using various data extrapolation methods. (See, Tsui, BMW, et al., "Cardiac SPECT reconstructions with truncated projections in different SPECT system designs," *J. Nucl. Med.*, 1992, 33:5, 831.) Other approaches include using singular value decompositions (See, Zeng G L, Gullberg G T, "An SVD study of truncated transmission data in SPECT," *IEEE Trans. Nucl. Sci*, 1997, 44:1, 107-111.) or knowledge of sets of know cross-sections. (See, Panin V Y, Zeng G L, Gullberg G T, "Reconstructions of Truncated Projections using an optimal basis expansion derived from the cross-correlation of a knowledge set of a priori cross-sections," *IEEE Trans. Nucl. Sci*, 1998, 54:4, 1229-2125.)

Reconstruction of truncated projections has also been investigated for CT images and for PET/CT systems that use CT images for attenuation correction. These techniques involve extension of the transmission projections beyond the FOV using a variety of extrapolation techniques with different constraints. (See Ohnesorge et al., "Efficient Correction for CT Image Artifacts Caused By Objects Extending Outside Scan Field of View," *Med. Phys.*, 27:1, 39-46, January 2000.)

SUMMARY

It is an object of the current invention to provide a method for extending truncated transmission projections beyond the measured field of view, especially for small FOV SPECT cameras that use arrays of Gd-153 transmission line sources attached to the detectors. The method may include the steps of generating an initial estimate of a transmission reconstruction without modeling source geometry or detector collimator response and refining the initial estimate iteratively by modeling the source geometry and the collimation geometry.

In the initial estimate, the transmission projections may be described by:

$$T_i = B_i e^{-\sum_{j=V(i)} \mu_j l(i,j)} + S_i$$

where
$T_i$ is the transmission projection at detector bin i,
$B_i$ is the blank projection at detector bin i,
$S_i$ is the estimated Compton down-scatter at detector bin i, V(i) is the set of voxels that project to detector bin i,
μ$_j$ is the attenuation of voxel j, and
l(i,j) is the contribution of voxel j to detector bin i.

The initial estimate may involve the steps of symmetric mirroring, apodization and smoothing. The step of refining the initial estimate may be accomplished by generating transmission projections outside the measured field of view using the initial estimate of the transmission reconstruction and the source intensities and position calculated from blank calibration images, appending the extended projections to the measured transmission projections at the edges of the field of view, and iteratively refining the initial estimate of the transmission reconstruction using the OSML algorithm with modified source geometry and a median root prior as a regularization step between iterations.

According to another aspect, a system is provided which includes a cardiac SPECT gamma camera, a processor that receives data from the gamma camera, and software for analyzing the data from the cardiac SPECT gamma camera and extending truncated transmission projections beyond a measured field of view. The software employs the method for extending truncated transmission projections beyond the measured field of view of this invention.

BRIEF DESCRIPTION OF THE DRAWINGS

Exemplary embodiments of the invention will now be described in greater detail in the following by way of example only and with reference to the attached drawings, in which.

DETAILED DESCRIPTION

Figure 1:
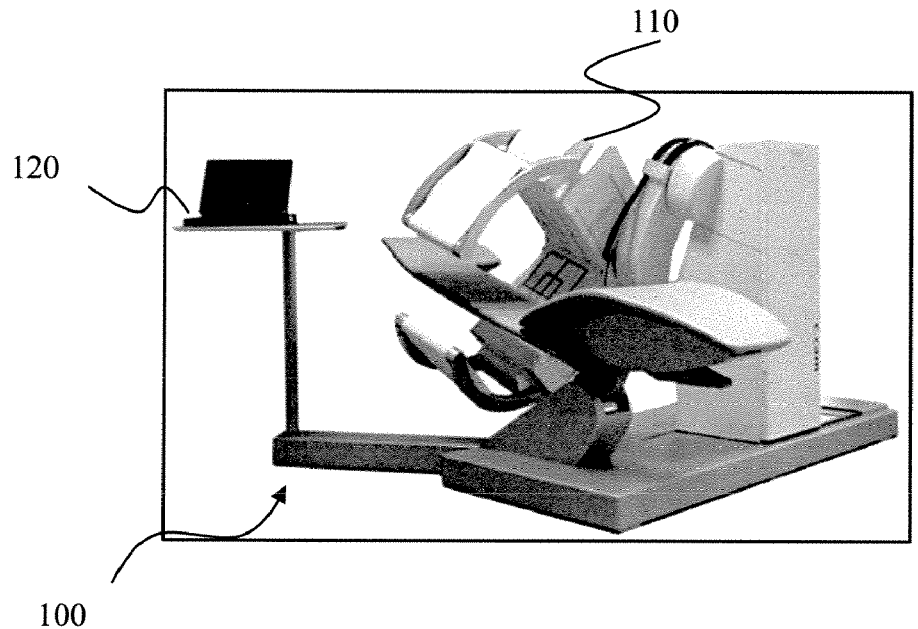
FIG. 1 shows an example of a system in accordance with an embodiment of the present invention.

FIG. 1 is an example of an example of a system 100 in accordance with an embodiment of the present invention. The system 100 may use a small FOV Cardiac Gamma Camera 110 (such as the Siemens c.cam cardiac SPECT camera) that may comprise a pair of gamma ray detectors configured at a fixed 90°. The transmission sources for each detector may be an array of line sources stored in cassette wings attached to the detectors. Each source wing may contain an array of 14 Gd-153 line sources of varying intensities. The intensities of the line sources vary such that the strongest sources may be at the center and the sources may become progressively weaker farther away from the center. The transmission sources may be fixed relative to the detectors during the SPECT acquisition; hence the transmission and emission projections may be inherently registered both spatially and temporally by a processor 120.

The detectors of camera 110 may have a small transverse FOV. Since the chest width of a patient can be much larger than the FOV, the processor 120 uses software that may reduce the artifacts in the transmission reconstruction resulting from truncation of the transmission projection data due to large or improperly positioned patients with respect to the FOV of the detectors. In such small FOV cameras, the patient imaging regions range from being visible in all angular views to not being visible in any view. The reconstructions of regions visible from only a few angular views can be severely degraded because of truncation of the projection data needed.

The method in accordance with an embodiment of the present invention may obtain approximate reconstructions of regions in the FOV that are completely truncated and may improve the reconstruction of regions in the FOV that are partially truncated.

The truncation compensation method in accordance with an embodiment of the present invention forms part of a transmission reconstruction scheme for small FOV SPECT cameras 110. The transmission reconstruction may be performed using an iterative, ordered subset maximum likelihood (OSML) algorithm using gradient descent, that may include accurate modeling of the source geometry calculated from blank calibration images, modeling of the detector collimator response, estimation of the Compton emission-to-transmission down-scatter, and truncation compensation.

The truncated compensation method in accordance with an embodiment of the present invention is based on extending the transmission projection data beyond the measured FOV and into truncated regions. The transmission reconstruction scheme broadly comprises the following two steps: (1) generation of an initial estimate of the transmission reconstruction without modeling the source geometry or the detector collimator response; and (2) iteratively refining the initial estimate of the transmission reconstruction by modeling the source and collimation geometry.

Figure 2:
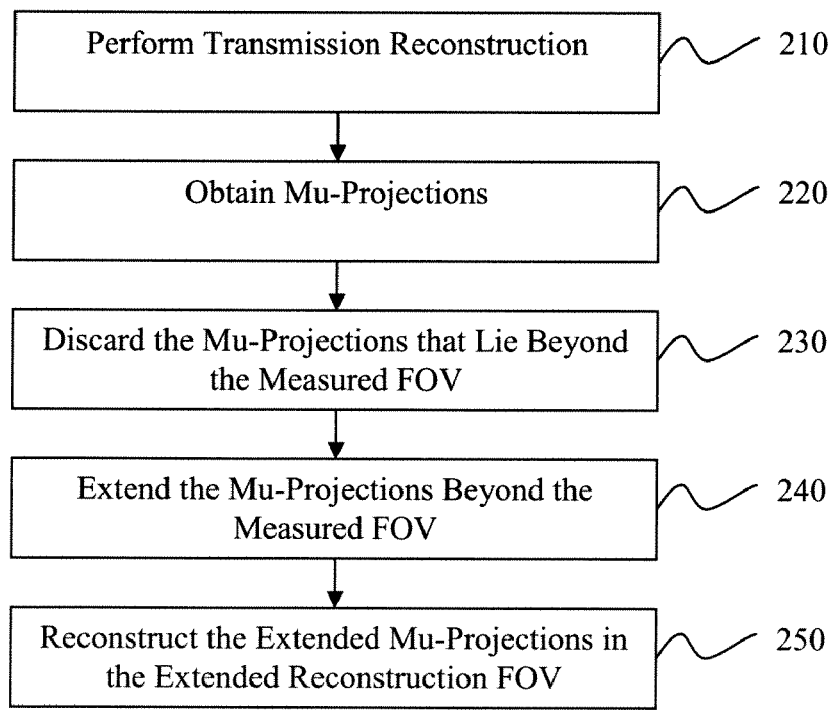
FIG. 2 depicts an example of a method of calculating the initial estimate in accordance with an embodiment of the invention.

FIG. 2 depicts a method of calculating the initial estimate. The calculation of the initial estimate of the transmission reconstruction may be to obtain an estimate that has been extended beyond the measured FOV. The transmission projection may be described by:

$$T_i = B_i e^{-\sum_{j=V(i)} \mu_j l(i,j)} + S_i \quad (1)$$

where
T$_i$ is the transmission projection at detector bin i,
B$_i$ is the blank projection at detector bin i,
S$_i$ is the estimated Compton down-scatter at detector bin i,
V(i) is the set of voxels that project to detector bin i,
μ$_j$ is the attenuation of voxel j, and
l(i,j) is the contribution of voxel j to detector bin i.

Furthermore, the summation $$\sum_{j=V(i)} \mu_j l(i, j)$$

is generally termed as the mu-projection for detector bin i and can be calculated as:

$$muprj_i = \log\left(\frac{B_i}{T_i - S_i}\right) \quad (2)$$

To obtain the initial estimate of the transmission reconstruction at step 210, first a variant of the iterative ordered subset maximum likelihood (OSML) algorithm with gradient descent that employs a simplified system model may be used. The reconstructed FOV may be greater than the FOV of the detectors and may be set to be equal to the FOV of a normal FOV system. The transmission radiation emanating from the line sources may be modeled as straight lines rather than true beams. The scatter estimate may be incorporated into the algorithm as an additive term as described by Eq. (1). Second, at step 220 the transmission reconstruction may be forward projected in order to obtain mu-projections. The forward projection may assume the simplified model for the transmission beams. Third, at step 230 the mu-projections outside the measured FOV may be discarded. Fourth, at step 240 the mu-projections at the edges of the FOV may be extrapolated using symmetric mirroring and apodization. Last, at step 250 an initial estimate of the transmission reconstruction may be obtained from the extrapolated mu-projections using an iterative ordered subset expectation maximization (OSEM) algorithm with the simplified system model.

Figure 3:
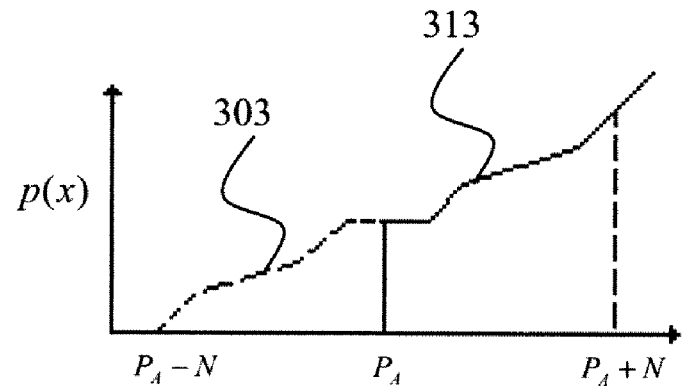
FIG. 3 is a graph representing an extended truncated edge where the FOV decreases towards the truncated edge.

FIG. 3 is a graph representing an extended truncated edge. The method used for extrapolating the mu-projections beyond the measured FOV at step 240 may be based on a symmetric mirroring and cosine weighted method. The projection data 313 are first extended beyond the FOV edge $P_A$ using symmetric mirroring, to obtain extended data 303. Looking at FIG. 3, let p(x) be one row of a projection view and $P_A$ be the truncation edge. The projection row is extended beyond $P_A$ as follows:

$$p_{ext}(P_A-k)=2p(P_A)-p(P_A+k), k=1,\ldots,N \quad (3)$$

where k=1–N is the extension range computed such that the extended FOV is the same of that of a normal FOV SPECT camera.

Figure 4:
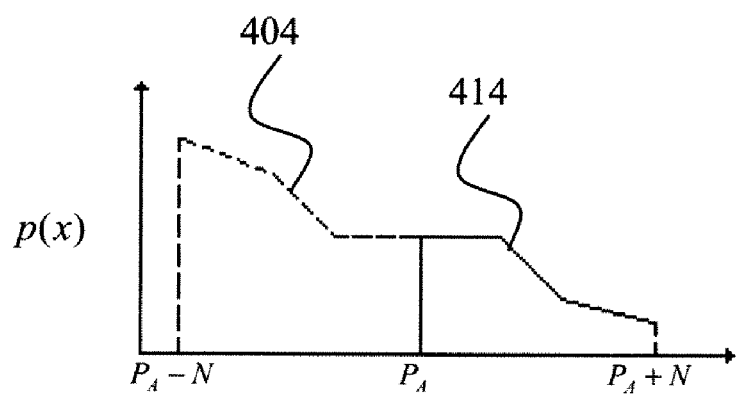
FIG. 4 is a graph representing an extended truncated edge where the FOV increase towards the truncated edge.

This mirroring technique performs satisfactorily if the projection data at the edge of the FOV decreases towards the truncation edge $P_A$, it is liable to produce unsatisfactory extrapolations if the projection data tends to increase towards the projection edge or is more random. FIG. 4 is a graph showing the situation where the projection data 414 increases towards the projection edge $P_A$, resulting in extended data 404 as a result of mirroring. In order to avoid such incorrect extrapolations, Eq (3) may be modified as follows:

$$p_{ext}(P_A-k)=\max(0,\min(p(P_A),2p(P_A)-p(P_A+k))), k=1,\ldots,N \quad (4)$$

which may ensure that the extrapolated data is never more than the value at the truncation edge. Together with the cosine weighting function described subsequently, the resulting extended projections always taper off to zero.

Figure 5:
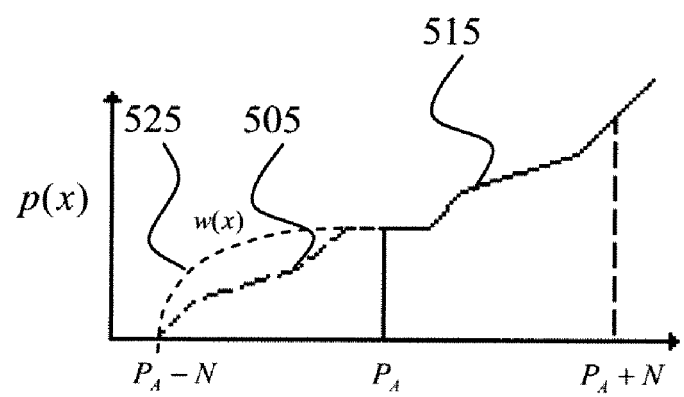
FIG. 5 is a graph representing an extended projection weighted with a cosine roll-off function.

FIG. 5 is a graph showing the extended projections 505 weighted with a cosine roll-off function 525 as follows:

$$w(k) = \left(\cos\left(\frac{(k-1)\pi}{N}\right)\right)^{\tau_{cos}} \quad (5)$$

$$p_{ext}(P_A - k) = w(k) * p_{ext}(P_A + k), k = 1, \ldots, N$$

where the exponent $\tau_{cos}$ is determined experimentally as 3.

This apodization function ensures that the extended projections gradually decrease to zero and reduces the possibility of erroneous reconstructions even if the extension does not closely approximate the true projections beyond the FOV.

As a final step to extrapolating the mu-projections at the edges of the FOV, the extension projections are smoothed in the vicinity of the truncation edge in order to remove any discontinuity at the edge.

Figure 6:
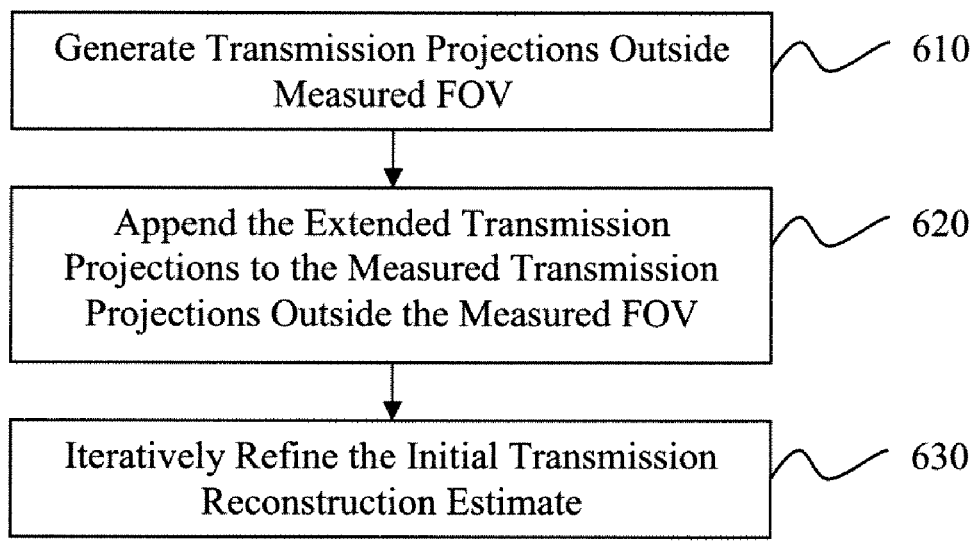
FIG. 6 depicts an example of a method of iterative refinement of the transmission reconstruction in accordance with an embodiment of the invention.

FIG. 6 depicts an example of a method of iterative refinement of the transmission reconstruction. The initial estimate of the transmission reconstruction as obtained using Equation (4) above may be refined using an iterative orders subset maximum likelihood (OSML) algorithm with gradient descent. This algorithm may model the geometry of the transmission line sources and the transmission beam emanating from these sources. The parameters of these models may be estimated from near and far blank calibration images.

In the absence of truncation, transmission beams from all line sources would be of the same angular width and the source strengths would decrease as the angle of incidence between the line source and the detector bin increases. In order to incorporate truncation compensation, however, it may be assumed that the regions in the transmission projections beyond the FOV are visible from the outermost line sources. The source strengths of these outer sources in these extended regions may also remain constant as the incidence angle increases.

The first step 610 of the iterative refinement of the transmission reconstruction is to generate transmission projections outside the measured FOV, using the modified source geometry together with the initial estimate of the transmission reconstruction and the source intensities and positions calculated from blank calibration images. Second, at step 620 the extended transmission projections are appended to the measured transmission projections outside the FOV. Third, at step 630 the initial estimate of the transmission reconstruction is iteratively refined based on the appended transmission projections using the OSML algorithm with the modified source geometry and a median root prior as a regularization step between iterations. The reconstruction may be performed in an extended FOV such that the reconstructed FOV is the same as that of a normal FOV SPECT camera. The process is then repeated at step 610 using the refined transmission reconstruction obtained at step 630, until the change in the resulting reconstruction image converges to a predetermined amount, or until some other predetermined optimization measure has been reached.

The transmission data truncation compensation method according to an embodiment of the present invention as described above provides a number of improvements over the prior art. For example, since each voxel in the reconstructed transmission FOV is now visible from each angular view of the extended projections, the degradation of the reconstruction quality in regions not visible in all views of the original projection data is diminished. Further, the reconstructions of the interior regions inside the measured FOV are influenced by the reconstructed regions outside the measured FOV, and are thus more accurate representations of the true reconstruction than that based on truncated data only.

As required, disclosures herein provide detailed embodiments of the present invention; however, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

What is claimed is:

1. A method of compensating for truncated transmission projection data beyond a measured field of view of a nuclear medicine imaging detector using fixed transmission line sources for attenuation correction, comprising:

(a) generating an initial estimate of a transmission reconstruction from truncated transmission projection data using a geometric model of transmission beams emanating from said sources as straight lines;
(b) modifying the geometric model of the transmission line sources and transmission beams emanating from said sources based on calibration images; and
(c) generating transmission projection data outside said measured field of view using the initial estimate together with the modified geometric model.

2. The method of claim 1, wherein step (a) further comprises:
(i) using a variant of an iterative ordered subset maximum likelihood (OSML) algorithm with gradient descent that employs a simplified system model to generate the initial estimate of the transmission reconstruction;
(ii) forward projecting the transmission reconstruction to obtain mu-projections;
(iii) discarding the mu-projections outside the measured field of view;
(iv) extrapolating the mu-projections at the edges of the field of view using symmetric mirroring and apodization; and
(v) obtaining the initial estimate of the transmission reconstruction from the extrapolated mu-projections.

3. The method of claim 2, wherein step (a)(i) has at least one of the following assumptions:
(1) the reconstructed field of view is greater than the field of view of the detectors and is set to be equal to the field of view of a normal filed of view system;
(2) the transmission radiation emanating from the line sources is modeled as straight lines rather than the true beams; and
(3) the scatter estimate is incorporated into the algorithm as an additive term as described by:

$$T_i = B_i e^{-\sum_{j=V(i)} \mu_j l(i,j)} + S_i.$$

4. The method of claim 2, wherein step (a)(ii) further comprises assuming the simplified model for the transmission beams.

5. The method of claim 2, wherein step (a)(v) further comprises using an iterative order subset expectation maximization (OSEM) algorithm with a simplified system model.

6. The method of claim 2, wherein step (a)(iv) further comprises:
(1) extending the projections beyond the field of view using symmetric mirroring;
(2) weighting the extended projections with a cosine roll-off function; and
(3) smoothing the extended projections in the vicinity of the truncation edge.

7. The method of claim 1, where step (b) further comprises:
(i) generating transmission projections outside the measured field of view using the initial estimate of the transmission reconstruction and the source intensities and position calculated from blank calibration images;
(ii) appending the extended projections to the measured transmission projections at the edges of the field of view; and
(iii) iteratively refining the initial estimate of the transmission reconstruction using the OSML algorithm with modified source geometry and a median root prior as a regularization step between iterations.

8. A cardiac SPECT gamma camera system, comprising:
at least one gamma-ray detector;
a plurality of transmission line sources of radiation;
a data processor; and
software on a computer readable medium, executable on the data processor for generating an initial estimate of a transmission reconstruction from truncated transmission projection data using a geometric model of transmission beams emanating from said sources as straight lines; modifying the geometric model of the transmission line sources and transmission beams emanating from said sources based on calibration images; and generating transmission projection data outside said measured field of view using the initial estimate together with the modified geometric model.

9. The system of claim 8, wherein the cardiac SPECT gamma camera has a pair of gamma-ray detectors with a fixed-90 degree angle therebetween.

10. The system of claim 8, wherein the cardiac SPECT gamma camera uses arrays of Gd-153 line sources as transmission sources.

11. The system of claim 8, wherein the software:
uses a variant of an iterative ordered subset maximum likelihood (OSML) algorithm with gradient descent that employs a simplified system model to generate the initial estimate of the transmission reconstruction;
forward projects the transmission reconstruction to obtain mu-projections;
discards the mu-projections outside the measured field of view;
extrapolates the mu-projections at the edges of the field of view using symmetric mirroring and apodization; and
obtains the initial estimate of the transmission reconstruction from the extrapolated mu-projections.

12. The system of claim 11, wherein the software:
generates transmission projections outside the measured field of view using the initial estimate of the transmission reconstruction and the source intensities and position calculated from blank calibration images;
appends the extended projections to the measured transmission projections at the edges of the field of view; and
iteratively refines the initial estimate of the transmission reconstruction using the OSML algorithm with modified source geometry and a median root prior as a regularization step between iterations.

* * * * *